United States Patent [19]

Chiu

[11] Patent Number: 5,669,567
[45] Date of Patent: Sep. 23, 1997

[54] BRAKE MECHANISM FOR DRUM TYPE MAGNETIC RECORDING AND REPRODUCING APPARATUS

[75] Inventor: Ming-Jer Chiu, Hsinchu, Taiwan

[73] Assignee: Industrial Technology Research Institute, Hsinchu, Taiwan

[21] Appl. No.: 529,799

[22] Filed: Sep. 18, 1995

[51] Int. Cl.$^6$ .................. G11B 15/32; G03B 1/04
[52] U.S. Cl. ............... 242/355; 242/355.1; 242/356; 360/96.3
[58] Field of Search ............... 242/355, 355.1, 242/356; 360/96.3

[56] References Cited

U.S. PATENT DOCUMENTS 5,481,418  1/1996  Maikuma et al. ............... 360/96.3 X

*Primary Examiner*—John Q. Nguyen
*Attorney, Agent, or Firm*—W. Wayne Liauh

[57] ABSTRACT

A brake mechanism of drum type magnetic recording and reproducing apparatus having a take-up reel, supply reel, each having a gear and reel body, and frictional force thus produced between said gear and real body during relative rotation. And a rocking gear mechanism selectively engages with the gear of said take-up reel or supply reel, and a brake plate mounted on said rocking gear mechanism, and including a first and second clutch teeth thereon, when said rocking gear mechanism engaged with said supply reel or take-up reel, said brake plate driven in rotation to enable said clutch teeth to engage with the gear of take-up reel to produce a brake force. With the aforesaid assembly, it may provide different back tension of tape under different modes of operation for said magnetic tape machine.

4 Claims, 7 Drawing Sheets

BRAKE MECHANISM FOR DRUM TYPE MAGNETIC RECORDING AND REPRODUCING APPARATUS

BACKGROUND OF THE INVENTION

This invention relates to a brake mechanism for drum type magnetic recording and reproducing apparatus, and particularly to a brake mechanism that is suitable for drum type magnetic recording and reproducing apparatus.

For dram type magnetic recording and reproducing apparatus in general, a back tension has to be exerted on the tape during the steps of tape LOAD, PLAY, REWIND, STOP, etc., so as to maintain the tape at a proper tension during various modes of operations to avoid tape distortion, breaking off, and/or twisting due to looseness. Therefore, a tape machine should have a brake mechanism for providing proper obstruction to the take-up reel or supply reel of the tape driving mechanism in order to apply a tension on the tape. However, because the required tension on the tape tends to be different for different modes of operations, the brake mechanism must provide different braking forces.

The conventional brake mechanism in general contains one main brake mounted near the take-up reel and the supply reel respectively, and a plurality of auxiliary brakes. The main brake is provided for holding up the take-up reel and the supply reel in order to prevent the tape from breaking away when the magnetic tape machine is on the STOP mode. The auxiliary brakes are provided for applying different frictional forces to the take-up reel and supply reel so as to provide different back tensions.

The conventional brake mechanism is often controlled by a link mechanism and actuated by a mode control cam having a plural cam slots for driving the link mechanism. Because there are a number of brakes (often more than 5 sets) of the brake mechanism, the structure and action of the link mechanism have become much too complicated resulting the undesirable complexity of the tape machine housing so that it is not easy for the space arrangement of the housing.

In view of this, the inventor has been engaged in the research and development based on the experience of development in related products over the years and finally has developed the present invention through continuous test and improvement.

SUMMARY OF THE INVENTION

One object of the invention is to provide a brake mechanism for drum type magnetic recording and reproducing apparatus which is simple in structure and cost-saving.

Another object of the invention is to provide a brake mechanism for drum type magnetic recording and reproducing apparatus which is simple in the action and control mechanisms.

Still another object of the invention is to provide a brake mechanism for drum type magnetic recording and reproducing apparatus which comprises fewer number of parts and smaller in size.

These and other objects and advantages of the present invention will become apparent to those skilled in art after considering the following detailed specification together with the accompanying drawings.

DETAILED DESCRIPTION OF PREFERRED EMBODIMENT

Figure 1:
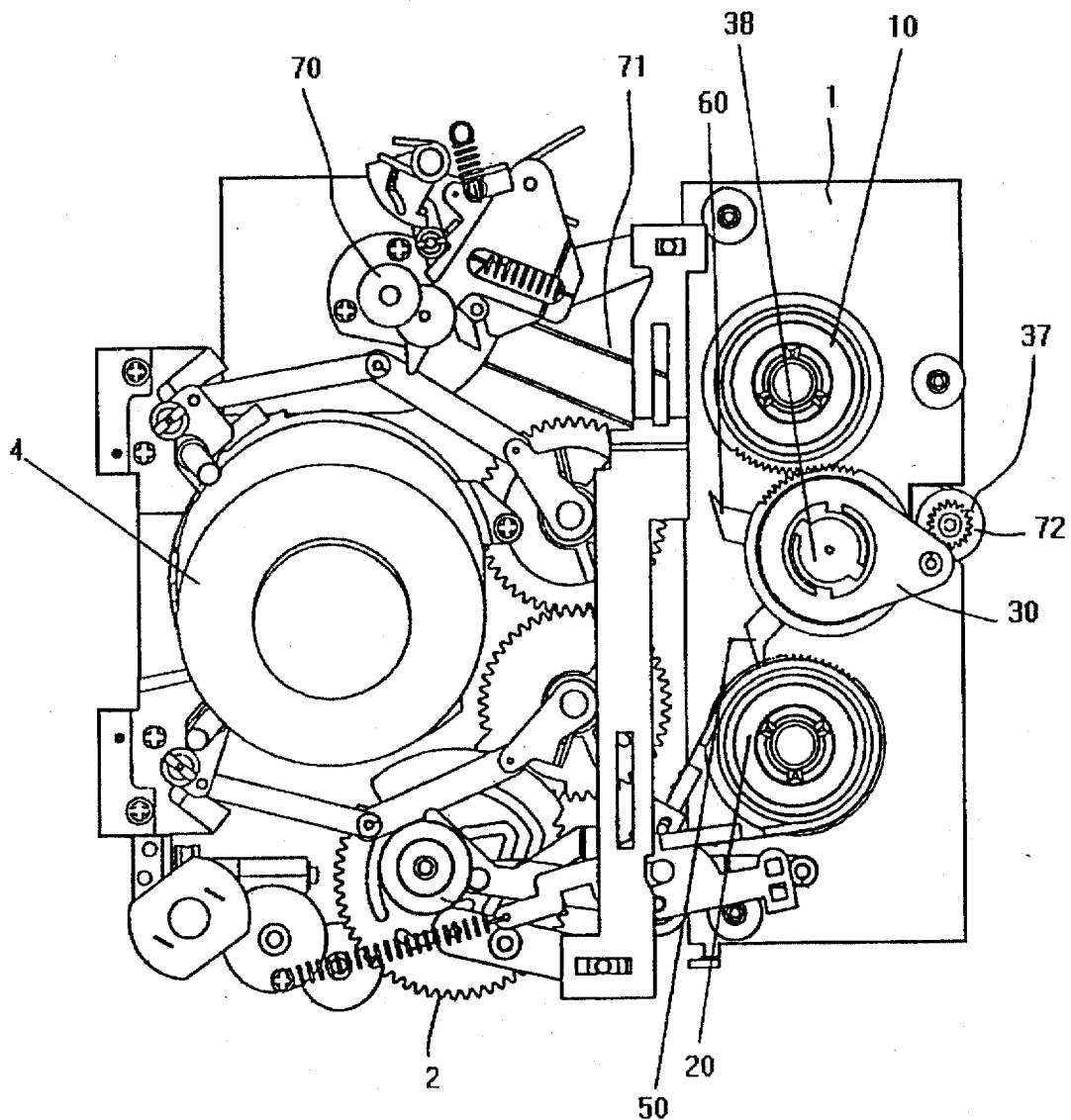
FIG. 1 is an elevational-assembly view of the present invention.
Figure 2:
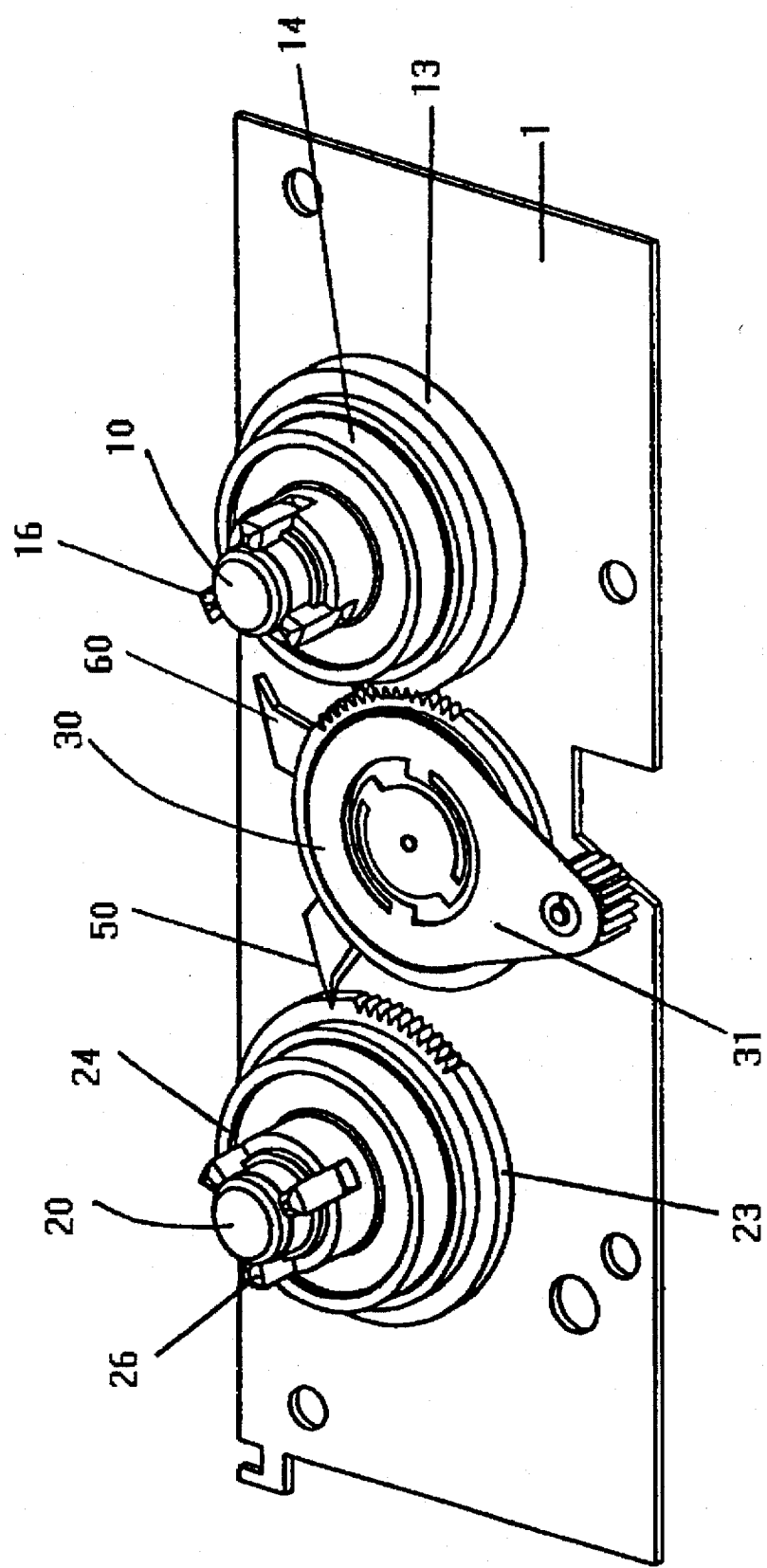
FIG. 2 is a partially-enlarged elevational view of the transmission device of tape machine according to the present invention.

Referring to FIGS. 1, 2, the present brake mechanism for dram type magnetic recording and reproducing apparatus comprises a rocking gear mechanism 30 mounted on the base plate 1 of the take-up reel 10 and supply reel 20 of the tape machine. The rocking gear mechanism 30 has a first and second clutches 50, 60 wherein the rocking gear mechanism 30 is selectively engaged with the take-up reel 10 and supply reel 20 when driving the tape in positive and negative rotation. And when the rocking gear mechanism 30 is in action, it may drive the first and second clutches gears 50, 60, enabling the take-up reel 10 and supply reel 20 to produce a braking function.

Figure 3:
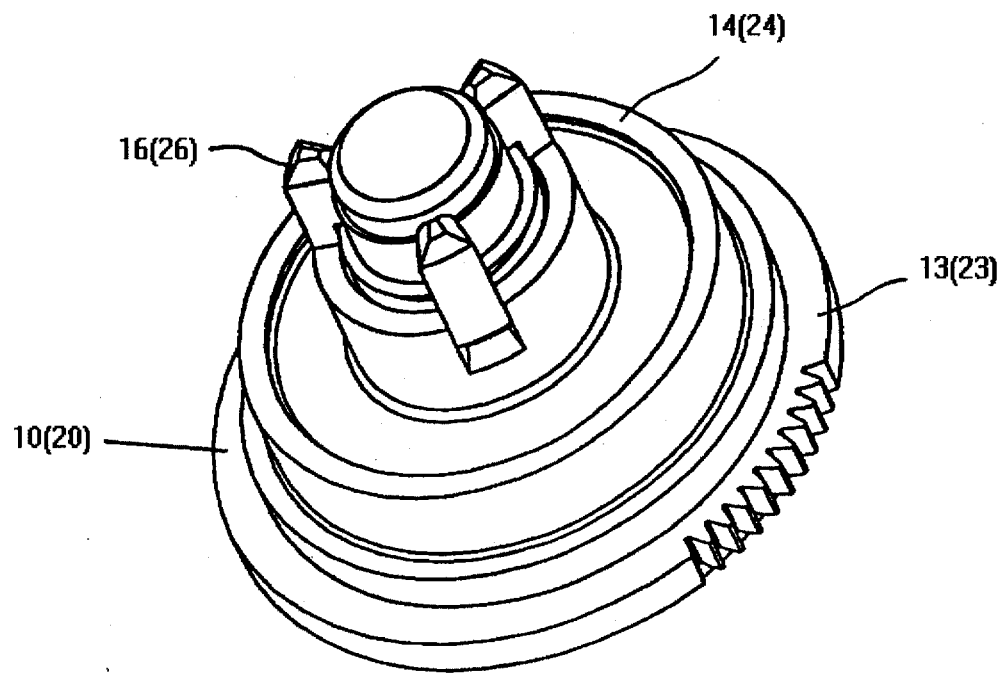
FIG. 3 is an elevational view showing the first embodiment of the supply reel and take-up reel of the present invention.
Figure 4:
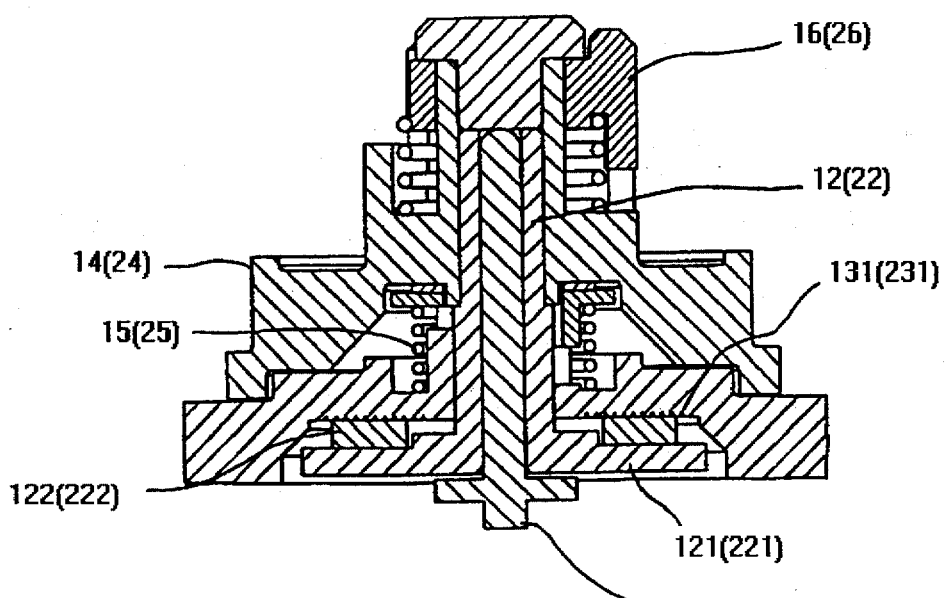
FIG. 4 is a sectional view showing the first embodiment of the supply reel and take-up reel of the present invention.

Referring to FIGS. 3 and 4, the structure of the take-up reel 10 is the same as that of the supply reel 20; the take-up reel 10 and supply reel 20 comprising hubs 11, 21 with bushes 12, 22 setting thereon. The hub bush 22 is a column body with its axial center vertical to the base plate 1 and rotably mounted gears 13, 23 thereon. The outer ring of the gears 13, 23 has a tooth shape engaged with the rocking gear mechanism 30, and the bottom has frictional planes 131, 231. On the hub bushes 12, 22 beneath the fictional planes 131, 231 has flat portions 121, 221, on the side of the flat portions 121, 221 corresponding to the frictional planes 131, 231 has fictional plates 122, 222 to contact the fictional planes 131, 231 by means of the fictional plates 122, 222 so that the gears 13, 23 may drive the hub bushes 12, 22 by means of friction.

On the upper portion of the gears 13, 23 has reel bodies 14, 24, the reel bodies are closely fitted to the hub bushes 12, 22 and on the bottom of the gears 13, 23 has springs 15, 25 the springs 15, 25 may engage a pressure upon the gears 13, 23, enabling the frictional planes 131, 231 to push against the frictional plates 122, 222 and therefore to produce a frictional force therebetween.

On the upper end of the take-up reels 14, 24 there are claws 16, 26 for driving the reel of the cassette tape. When the gears 13, 23 are driven by the rocking gear mechanism 30, the gears 13, 23 may transmit torque to the reel bodies 14, 24 and claws 16, 26 through the hub bushes 12, 22 by means of mutual friction between fictional planes 131, 231 and fictional plates 122, 222, to lead the reel of magnetic tape in rotation.

Figure 5:
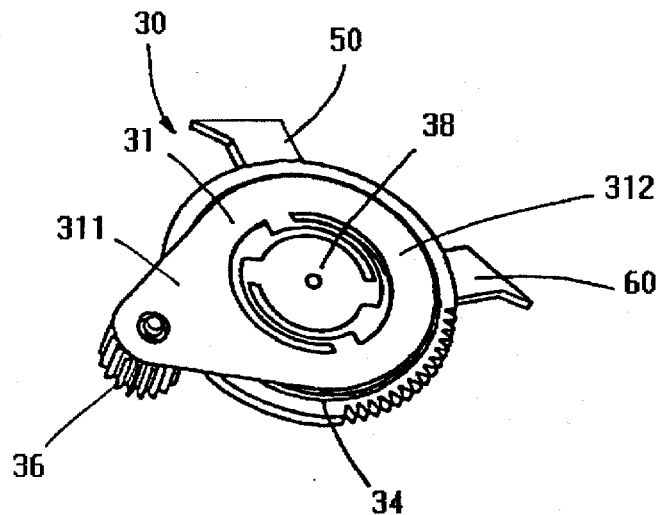
FIG. 5 is an elevational view of the rocking gear mechanism of the present invention.
Figure 6:
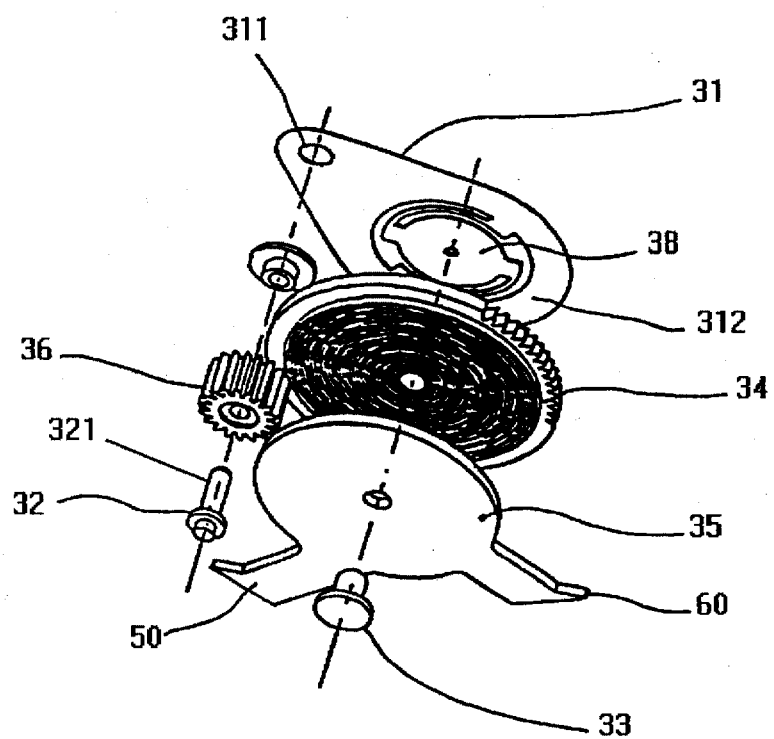
FIG. 6 is an elevational-exploded view of the rocking gear mechanism of the present invention.

Referring to FIGS. 5 and 6, the present rocking gear mechanism 30 has a rocking arm 31. The rocking arm has a first end 311, and with a pin 32 it can be pivotted on the base plate 1 in a rotary manner along parallel direction to the base plate 1, and a second end 312 for vertically inserting a pinch 33 for coaxially and rotably mounting the rocking gear 34 and a brake plate 35 on the second end 312.

On the pin 32 is cased with a hub 321 and a drive gear 36 for engaging with the rocking gear. Referring to FIG. 1, the drive gear 36 may engage with a transmission gear 37. The transmission gear 37 can be driven by the belt 71 driven by reel motor 70 while enabling the rocking gear 34 of the drive gear 36 in rotation.

On the second end 312 of the rocking arm 31 is a sheet spring 38 for imposing a resilience upon the rocking gear 34 to cause frictional force among the rocking gear 34, the rocking arm 31 and brake plate 35. Owing to the function of the frictional force, when the rocking gear 34 is driven by the drive gear 36, initially it will not produce relative rotation with the rocking arm 31 but moving around the drive gear 36 along the same direction as the rotation of the drive gear 36 so that the rocking arm 31 will be swinging around the pin 32. The brake pad 35 is overlaying with the rocking gear and there has proper frictional force on the contact plane between the both whereby when the rocking arm 34 gears up with the gears 13, 23 to turn around the pinon 33, the brake pad 35 may also be driven by frictional force.

Figure 7:
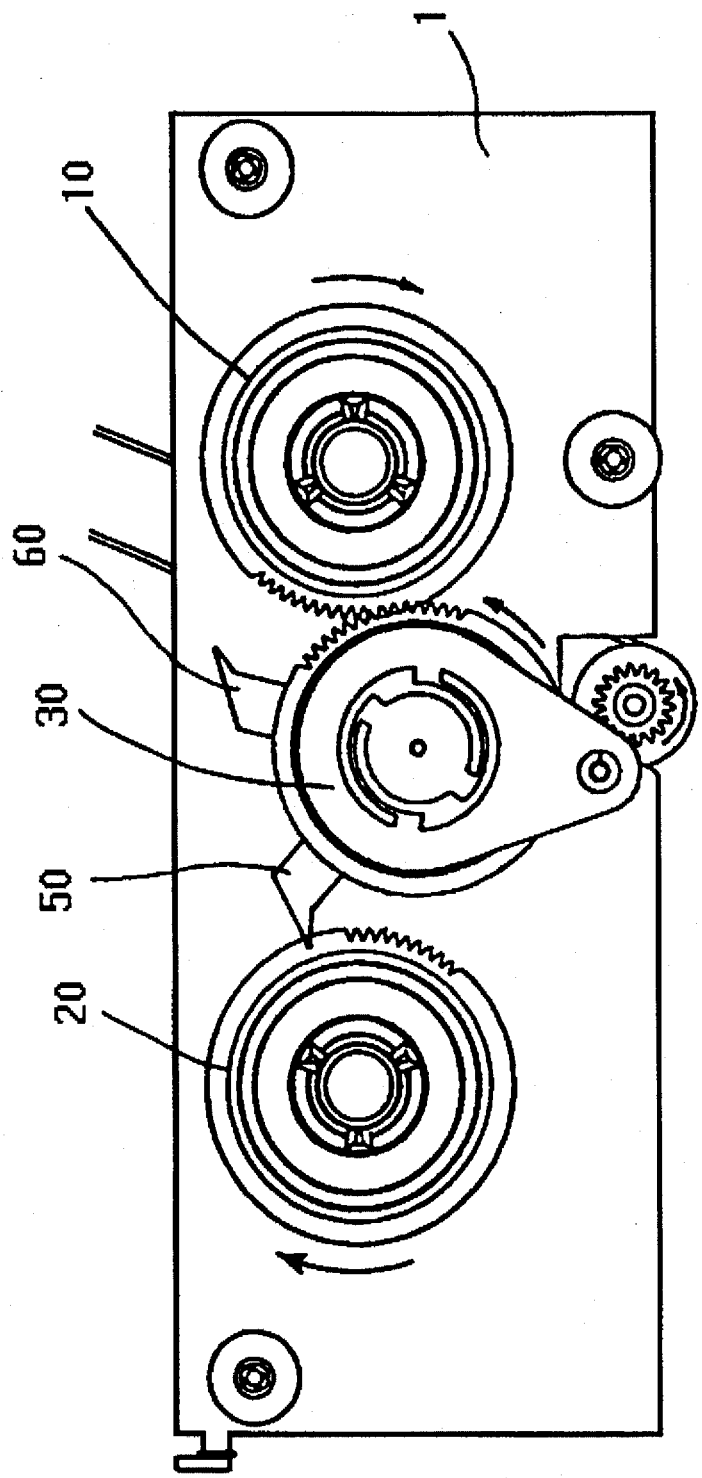
FIG. 7 is a diagramatic view showing the action of the brake mechanism in driving the take-up reel of the present invention.
Figure 8:
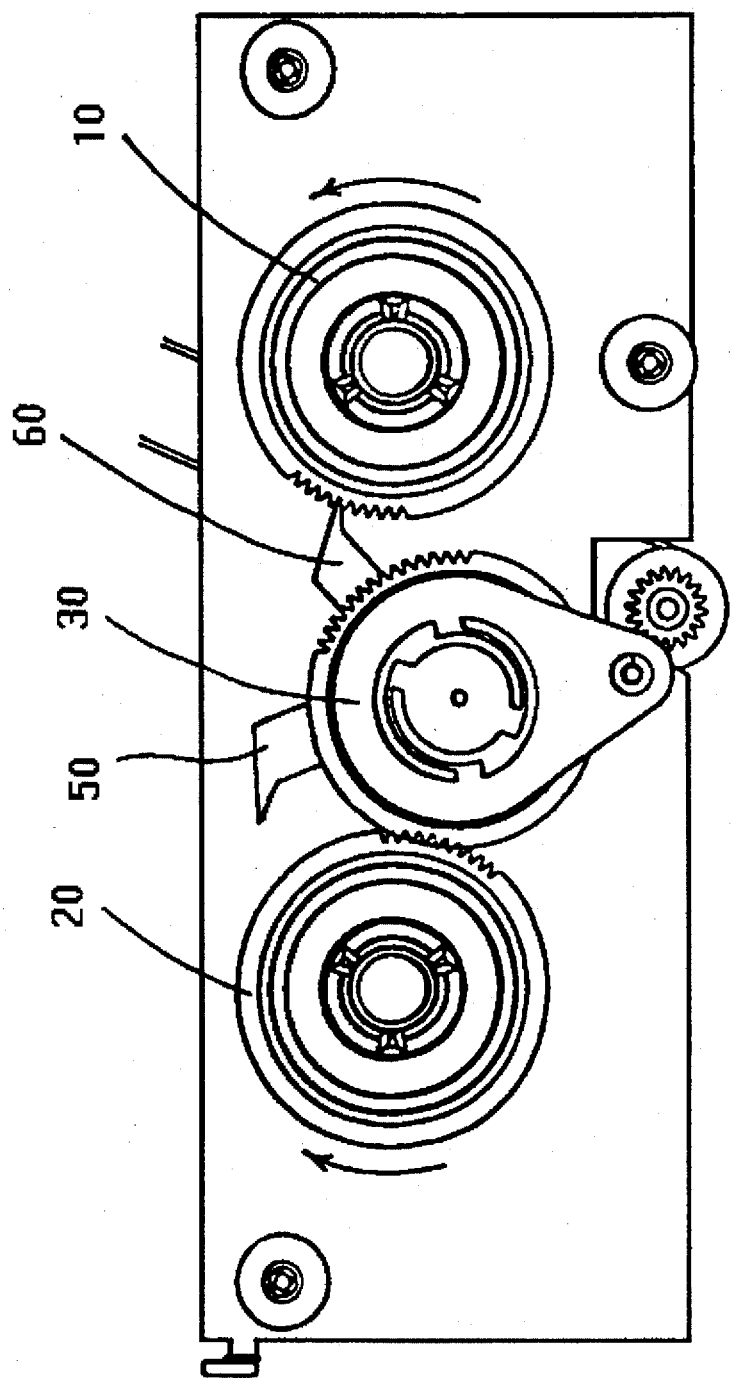
FIG. 8 is a diagramatic view showing the action of the brake mechanism in driving the supply reel of the present invention.

Referring to FIGS. 7, 8, the rocking gear mechanism is mounted on the rocking arm 31 for swinging to the right and left, the rocking gear 34 may move to the first and second positions respectively for engaging with the supply reel 20 and take-up reel 10.

When the rocking gear 34 is swinging to engage with the gears 13, 23 of take-up reel 10 or supply reel 20, it will be interrupted to stop moving around the drive gear 36 while to move around the pinch 33 whereby it has become the first idle gear between the drive gear 36 and take-up reel 10 or the gear 13 and gear 23 of supply reel while enables the take-up reel 10 or supply reel 20 to be driven in rotation.

The brake pad 35 has the second clutch tooth 60 near the take-up reel 10 while has the first clutch tooth 50 near the supply reel 20. The first and second clutch teeth will be driven to engage with the gears 13, 23 when the rocking gear 34 engages with the gear 13 of the take-up reel 10 to move around the pinch 33.

Referring to FIG. 7, when magnetic tape machine is in positive rotation, the take-up reel 10 will turn around clockwise whereby when with the rocking gear 34 engages with the gear 13 for taking up the tape and the rocking arm 34 is in negative rotation so as to drive the brake pad 35 in rotation counterclockwise, enabling the first clutch gear 50 to engage with gear 23 without rotation. Because the reel body of the supply reel 20 is dragged by the tape so that a relative rotation is produced between the reel body 21 and gear 23 whereby frictional force between the reel body 21 and gear 23 provides an obstruction to become back tension T1 on the tape.

Referring to FIG. 8, when the rocking gear 34 engages with the supply reel 20 for proceeding REVERSE TAPE, the supply reel 20 will mm around counterclockwise and the rocking gear 34 will turn around clockwise so as to drive the second clutch tooth 60 engaging with the gear 13 so that a relative rotation is produced between the reel body 11 and gear 13 whereby a back tension T2 is produced.

The aforesaid back tensions T1, T2 may be designed into different force in order to adapt to tape back tension necessary for different operating modes of the tape machine. The method of change may be accomplished through the change of the material and diameter of the frictional plate, and the resilience of spring to enable the change of frictional force between reel bodies 11, 21 of the take-up reel 10 and supply reel 20 for producing different obstruction.

Figure 9:
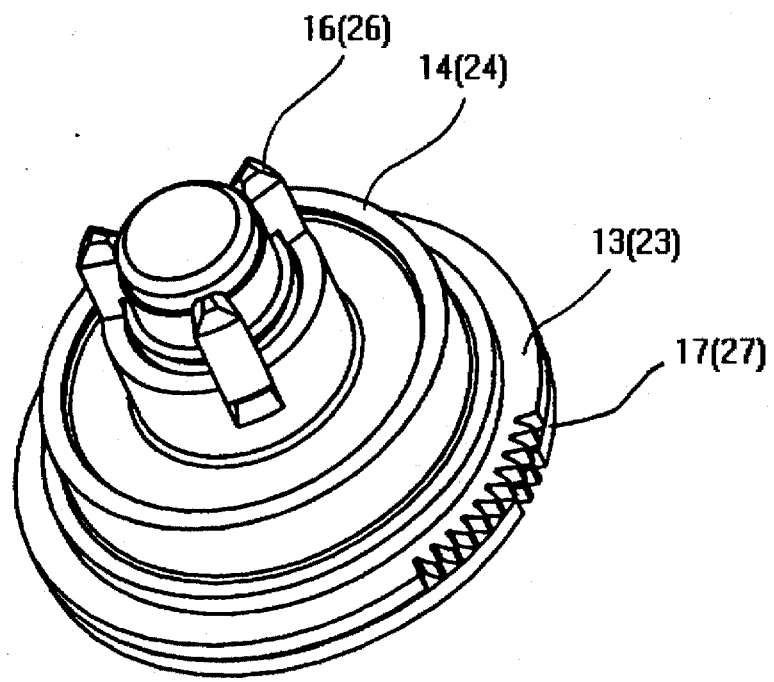
FIG. 9 is an elevational view showing the second embodiment of the supply reel and take-up reel of the present invention.
Figure 10:
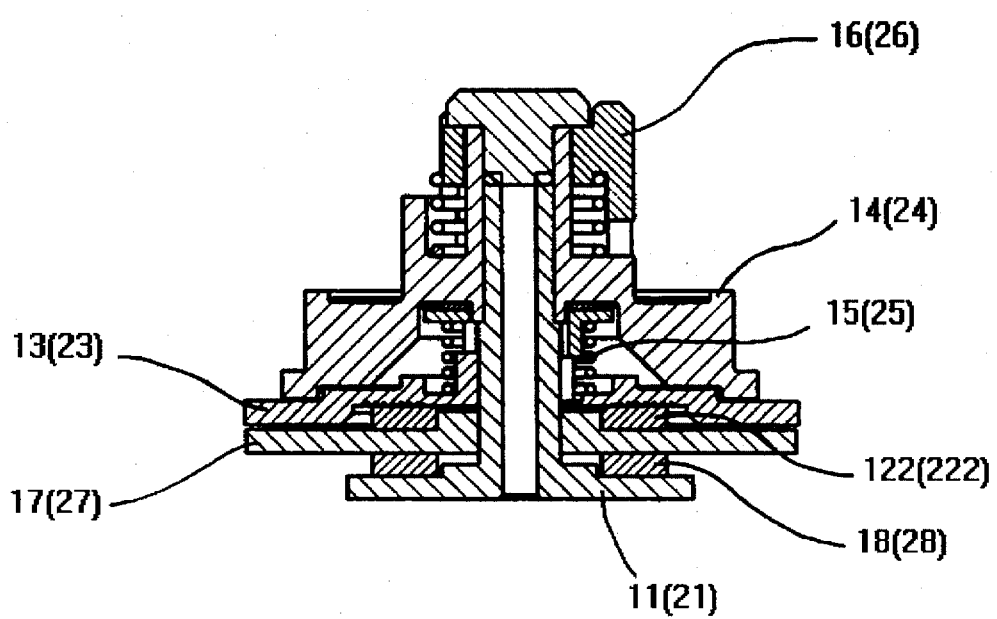
FIG. 10 is a sectional view showing the second embodiment of the supply reel and take-up reel of the present invention.

Referring to FIGS. 9, 10, the structure of take-up reel 20 or supply reel 10, under the gears 13, 23 has second gears 17, 27 that are rotable relatively to the take-up reel bodies 11, 21, and gears 13, 23, and there has second frictional plates 18, 28 between the second gears 17, 27 and the gears 13, 23. When the resilience of the springs 15, 25 is imposed on the gears 13, 23, enabling frictional force to produce on the contact plane between with the frictional plates 121, the second gears 17, 27, and the second frictional plates 18, 28, and flat plates 121, 221.

The amount of frictional force between the second frictional plates 18, 28, the gears 13, 23, and second gears 17, 27 is different with the frictional force between the frictional plates 122, 222, reel bodies 11, 21 and gears 13, 23 so that the take-up reel 10 or supply reel 20 has two different back tensions. Either of the gears 13, 23, or the second gears 17, 27 may engage with the rocking gear 34, and the other one not engage with the rocking gear 34 may engage with the first and second clutch teeth 50, 60 of the brake pad 35 whereby two different tensions can be produced by the take-up reel 10 or supply reel 20 by means of control over the rocking gear 34 and the first and second clutch teeth 50, 60.

The take-up reel 10 and supply reel 20 may be constructed as FIGS. 9, 10, and the magnetic tape machine may provide four different back tensions, in addition, they may be constructed as the first embodiment whereby the magnetic tape machine may provide three different back tensions.

Compared to the conventional brake mechanism, the present invention has a largely simplified structure of control mechanism for braking is totally controlled by reel motor 70 and rocking gear mechanism 30 and it may save a large space for layout. Furthermore, the conventional tape brake mechanism has one brake mechanism on each side of supply reel and take-up reel. On comparison, the present invention has only one rocking gear 34 and the first and second clutch teeth 50, 60 on brake pad 35 which may accomplish all the brake action. Because the present invention requires less parts, it may save the space and simplify the structure.

I claim:

1. A brake mechanism for drum type magnetic recording and reproducing apparatus including:

first and second reels each having: a pivot vertically mounted on a base plate of said magnetic tape machine; a first gear rotably mounted on said pivot; a first reel body coaxially and rotably fitted to said pivot with said first gear; a first frictional device providing a frictional force between said first gear and said first reel body, said first gear is structured such that when said first gear is put in rotation, said fist gear drives said first reel body in rotation to produce a braking force therebetween;

a reel motor for providing power necessary for said first reel or said second reel to drive a reel of said cassette;

a rocking gear mechanism mounted between said first and second reels, including: a drive gear being driven by said reel motor in rotation; and a rocking arm having a first end and a second end, said first end having a pinch swingingly pivoted on said base plate, a transmission gear rotably mounted on said pinch for engaging with said drive gear; and said second end having a rocking gear pivotally connected thereto for engaging with said transmission gear, and selectively engaging with said first gear or said second gear in accordance with a swinging of said rocking arm; and first friction means for providing a frictional force between said rocking gear and rocking arm;

said transmission gear wherein said transmission gear is driven by said drive gear in rotation, and is structured such that said rocking arm is first driven in rotation to cause said rocking gear to be selectively engaged with said first gear of said first and second reels and then in rotation opposite said transmission gear;

a brake plate coaxially mounted with said rocking gear on said second end of said rocking arm, and second frictional means for providing a frictional force between said brake plate and said rocking gear to cause said rocking gear to drive said brake plate in rotation;

a first clutch tooth provided on said brake plate for engaging with said first gear of said first reel when said rocking gear is engaged with said first gear of second reel; and a second clutch tooth for rotably engaging with said first gear of said second reel when said rocking gear is engaged with said first gear of first reel;

wherein said rocking gear and said first and second clutch teeth are structured to match an operating mode of said magnetic tape, causing said first and second reels to provide a varying brake force and thus a varying back tension on the tape.

2. The brake mechanism for drum type magnetic recording and reproducing apparatus as claimed in claim 1 wherein said second end of said rocking arm contains a spring to contact said rocking gear for imposing urging force upon said rocking gear so as to produce a frictional force between said rocking gear and said rocking arm.

3. The brake mechanism for drum type magnetic recording and reproducing apparatus as claimed in claim 1 wherein the first frictional device of said first or second reel includes: two frictional plates respectively mounted on said first and second reel bodies between axial contacting planes of said first and second gears; and two springs for providing an urging force upon said first and second reel bodies, respectively, so as to produce a frictional force between said first and second reel bodies and said two frictional plates, respectively.

4. The brake mechanism for drum type magnetic recording and reproducing apparatus as claimed in claim 1 wherein each of said first and second reels further includes: a second gear and a second frictional device between said second gear and said first frictional device; said second frictional device and said first frictional device are constructed to provide different frictional force so that said first reel or said second reel is capable of providing varying back tension on the tape when said rocking gear or said first or second clutch tooth engages with said first gear or said second gear.

* * * * *